United States Patent Office 3,849,513
Patented Nov. 19, 1974

3,849,513
DISPROPORTIONATION PROCESS
Gerald Doyle, Somerville, N.J., assignor to Exxon Research and Engineering Company
No Drawing. Continuation-in-part of application Ser. No. 862,970, Oct. 1, 1969, now Patent No. 3,686,136. This application June 8, 1972, Ser. No. 260,826
Int. Cl. C07c 3/62
U.S. Cl. 260—683 D    15 Claims

ABSTRACT OF THE DISCLOSURE

This invention relates to an improved disproportionation process. In this process, olefins, including both mono and polyolefinic hydrocarbons, and their substituted derivatives, are contacted at reaction conditions in the presence of a catalyst which is prepared by the contacting of a carbonyl complex having the general formula $$R[M(CO)_aX_b]$$

wherein R is selected from the group consisting of alkali metal ions and cations of the type $J_4Q$ wherein Q is selected from the group consisting of nitrogen, phosphorous, arsenic, and antimony, and J is selected from the group consisting of hydrogen, $C_1$–$C_{30}$ hydrocarbyl radicals, and the halogenated derivatives thereof, M is a Group VI transition metal, X is a uninegatively charged ligand, selected from the group consisting of halide, cyanide, cyanate, thiocyanate, azide, $C_1$–$C_{20}$ alkoxide radicals, $C_1$–$C_{20}$ carboxylate radicals, and the halogenated derivatives thereof, $a$ is an integer of from 1 to 5, and $b$ is an integer of from 1 to 3 with an activator, said activator consisting essentially of an organometallic compound selected from the group consisting of compounds having the general formula $r_nLY_m$ wherein $r$ is independently selected from the group consisting of hydrogen, $C_1$–$C_{30}$ hydrocarbyl radicals and the halogenated and oxygenated derivatives thereof, L is selected from the group consisting of Group I-A, II-A and III-A metals, said metals having an atomic number of from 3 to 31, Y is a halogen radical, $n$ is an integer of from 1 to 3, and $m$ is an integer of from 0 to 3, $n$ and $m$ having a total equal to the valence of L, at a temperature of from about —100 to +150° C. and a pressure of between 0.1 and 1000 atmospheres, the molar ratio of organometallic compound to metallic composition varying between 0.5:1 and 50:1, whereby a catalyst is formed. Preferably, R is selected from the group consisting of cations having the general formula $J_4Q$ wherein Q is selected from the group consisting of nitrogen, phosphorous, arsenic, and antimony, and J is selected from the group consisting of hydrogen, $C_1$–$C_{30}$ hydrocarbyl radicals, and the halogenated derivatives thereof, X is a halide, and said organometallic compound is an alkyl aluminum halide.

REFERENCE TO RELATED CASES

This patent application is a continuation-in-part of Ser. No. 862,970, filed on Oct. 1, 1969, in the name of Gerald Doyle, now U.S. Pat. 3,686,136.

BACKGROUND OF THE INVENTION

Field of the invention

This invention relates to an improved disproportionation process. In this process, olefins, including both mono and polyolefinic hydrocarbons, and their substituted derivatives, are contacted at reaction conditions in the presence of a catalyst which is prepared by the contacting of a carbonyl complex having the general formula $$R[M(CO)_aX_b]$$

wherein R is selected from the group consisting of alkali metal ions and cations of the type $J_4Q$ wherein Q is selected from the group consisting of nitrogen, phosphorous, arsenic, and antimony, and J is selected from the group consisting of hydrogen, $C_1$–$C_{30}$ hydrocarbyl radicals, and the halogenated derivatives thereof, M is a Group VI transition metal, X is a uninegatively charged ligand, selected from the group consisting of halide, cyanide, cyanate, thiocyanate, azide, $C_1$–$C_{20}$ alkoxide radicals, $C_1$–$C_{20}$ carboxylate radicals, and the halogenated derivatives thereof, $a$ is an integer of from 1 to 5, and $b$ is an integer of from 1 to 3 with an activator, said activator consisting essentially of an organometallic compound selected from the group consisting of compounds having the general formula $r_nLY_m$ wherein $r$ is independently selected from the group consisting of hydrogen, $C_1$–$C_{30}$ hydrocarbyl radicals and the halogenated and oxygenated derivatives thereof, L is selected from the group consisting of Group I-A, II-A and III-A metals, said metals having an atomic number of from 3 to 31, Y is a halogen radical, $n$ is an integer of from 1 to 3, and $m$ is an integer of from 0 to 3, $n$ and $m$ having a total equal to the valence of L, at a temperature of from about —100 to +150° C. and a pressure of between 0.1 and 1000 atmospheres, the molar ratio of organometallic compound to metallic composition varying between 0.5:1 and 50:1, whereby a catalyst is formed. Preferably, R is selected from the group consisting of cations having the general formula $J_4Q$ wherein Q is selected from the group consisting of nitrogen, phosphorous, arsenic, and antimony, and J is selected from the group consisting of hydrogen, $C_1$–$C_{30}$ hydrocarbyl radicals, and the halogenated derivatives thereof, X is a halide, and said organometallic compound is an alkyl aluminum halide.

Description of the prior art

The disproportionation of olefins refers to those reactions in which one or more olefinic compounds are transformed into other olefins of different molecular weights. The reaction can be regarded as consisting of the breaking of the double bonds of the reacting olefins and the recombination of the resulting fragments in such a manner that new olefinic products result. Various homogeneous and heterogeneous catalyst systems may be used to effect said transformation, e.g. see Belgian Pat. 714,621.

SUMMARY OF THE INSTANT INVENTION

According to this invention it has unexpectedly been found that carbonyl complexes having the general formula $R[M(CO)_aX_b]$ when reacted with an organometallic compound, said organometallic compound selected from the group consisting of compounds having the general formula $r_nLY_m$ wherein $r$ is independently selected from the group consisting of hydrogen, $C_1$–$C_{30}$ hydrocarbyl radicals and the halogenated and oxygenated derivatives thereof, L is selected from the group consisting of Group I-A, II-A and III-A metals, said metals having an atomic number of from 3 to 31, Y is a halogen radical, $n$ is an integer of from 1 to 3, and $m$ is an integer of from 0 to 3, $n$ and $m$ having a total equal to the valence of L, produce an extremely effective catalyst, especially for olefin disproportionation reactions.

In the above formula for the carbonyl complex R is selected from the group consisting of alkali metal ions and cations of the type $J_4Q$ wherein Q is selected from the group consisting of nitrogen, phosphorous, arsenic, and antimony, and J is selected from the group consisting of hydrogen, $C_1$–$C_{30}$ hydrocarbyl radicals and the halogenated and oxygenated derivatives thereof. J is preferably a $C_1$–$C_{30}$ hydrocarbyl radical. M is a Group VI transition metal and X is a uninegatively charged ligand, selected from the group consisting of halide, cyanide, cyanate, thiocyanate, azide, $C_1$–$C_{20}$ alkoxide radicals, $C_1$–$C_{20}$ carboxylate radicals, and the halogenated derivatives thereof. Preferably, R is $J_4Q$ as defined above, and X is halide; most preferably a chloride; $a$ is an integer of from 1 to 5 and $b$ is an integer of from 1 to 3, their total being equal to 6. Preferably, $a$ is 5 and $b$ is 1.

The preferred Group VI transition metal within the scope of the above definition is molybdenum.

The preferred carbonyl complexes for use in preparing catalysts for disproportionation reactions are the quaternary ammonium salts as represented by the general formula $$J_4N[M(CO)_5X]$$

wherein J, M and X are as defined above. More preferably, the tetraalkyl ammonium salts are utilized.

Specific examples of the carbonyl complexes which are useful for preparing disproportionation catalysts include:

(n-$C_4H_9$)$_4$N[Mo(CO)$_5$Cl]
(n-$C_4H_9$)$_4$N[Mo(CO)$_5$Br]
(n-$C_4H_9$)$_4$N[Cr(CO)$_5$Cl]
(n-$C_4H_9$)$_4$N[W(CO)$_5$Cl]
(iso-$C_3H_7$)$_4$N[W(CO)$_5$Cl]
(n-$C_2H_5$)$_2$iso($C_3H_7$)$_2$N[W(CO)$_5$Br]
NH$_4$[Mo(CO)$_5$Cl]
(n-$C_4H_9$)$_4$P[W(CO)$_5$Cl]

The catalyst of the instant invention is a reaction product of the above defined Group VI transition metal carbonyl complex with one or several organometallic compounds having the general formula $r_nLY_m$. Preferably, $r$ is independently selected from the the group consisting of $C_1$–$C_{30}$ hydrocarbyl radicals, i.e. alkyl, cycloalkyl, alkenyl, aryl, alkaryl, and aralkyl radicals, preferably $C_1$–$C_{10}$ alkyl radicals. $r$, as defined above may be methyl, ethyl, n-propyl, isopropyl, isobutyl, secondary-butyl, tert-butyl, n-amyl, isoamyl, heptyl, n-octyl, n-dodecyl, and the like; 2-butenyl, and the like, cyclopentylmethyl, cycohexylethyl, cyclohexylpropyl, and the like; 2-phenyl ethyl, 2-phenyl propyl, 2-naphthyl ethyl, methyl naphthyl ethyl, and the like; cyclopentyl, cyclohexyl, 2,2,1-bicycloheptyl, and the like; methyl cyclopentyl, dimethyl cyclopentyl, ethyl cyclopentyl, methyl cyclohexyl, dimethyl cyclohexyl, 5-cyclopentadienyl, and the like; phenyl cyclopentyl, and the like; phenyl, tolyl, xylyl, ethyl phenyl, naphthyl, cyclohexyl phenyl, and the like; methoxy, n-butoxy, t-butoxy, n-nonoxy, and the like; 2-chlorobutyl, 2-bromodecyl, o-chlorophenyl, 4-fluorocyclohexyl, and the like. In general, L may be selected from such metals as lithium, sodium, magnesium, calcium, gallium, zinc, cadmium, boron, and aluminum; most preferably aluminum. Y may be a fluorine, chlorine, bromine or iodine radical; preferably a chlorine or bromine radical; and most preferably a chlorine.

Specific examples of the above defined organometallic compounds include phenyl lithium, methyl sodium, t-butyl potassium, lithium hydride, diethyl zinc, ethylberyllium hydride, diethylmagnesium, methylgallium dibromide, dimethyl calcium, triethylaluminum, triisobutyl aluminum, trieicosylaluminum, 5-pentyl aluminum dichloride, di-(3-ethoxy pentyl) aluminum chloride, etc.

Preferred organometallic compounds are aluminum derivatives of the formula $R'AlY_2$ wherein R' is selected from the group consisting of $C_1$–$C_{30}$ hydrocarbyl radicals and the halogenated, preferably chlorinated, derivatives thereof. R' is more preferably selected from the group consisting of $C_1$–$C_{12}$ alkyl radicals; and Y is as defined above. It should be noted that the formula $R'AlY_2$ is a stoichiometric representation and thus compounds such as methylaluminum dichloride, ethylaluminum dichloride, methylaluminum sesquichloride, etc. may be employed. The most preferred compound, which appears to give the best catalyst, is methylaluminum dichloride.

Aluminum halides of the general formula $AlX'_3$ wherein X' is a halogen may be used in place of the organometallic compound. Preferably, X' is bromine or chlorine, more preferably chlorine.

Aluminum alkoxides may also be used in place of the above defined organometallic compounds. In general aluminum alkoxides of the general formula $R'_cAl(OR')_d$ wherein R' is defined above, $c$ and $d$ are integers of from 1 to 2, their total being equal to 3, may be used in place of the organometallic compound in preparing the active disproportionation catalysts of the instant invention.

The two compounds, the Group VI transition metal complex and the organometallic compounds, are reacted at a temperature of about −100 to +150° C., preferably −50 to +100° C., and most preferably 0° to 50° C. Pressure may vary between 0.1 and 1000 atmospheres, preferably between 0.5 and 200 atmospheres, and most preferably between 1 and 100 atmospheres. The reactants are in the liquid phase, i.e. dissolved in a suitable solvent. The ratio of organometallic compound to the Group VI transition metal complex may be varied between 0.5:1 and 50:1, preferably 1:1 to 15:1 and most preferably 2:1 to 8:1 on a mole basis. Contacting time for the reaction may vary between 1 minute and several days, preferably between 0.1 and 48 hours and most preferably between 0.2 to 24 hours. It is particularly important that these activators be substantially, and preferably completely, free of water since water can cause hydrolysis, thereby inhibiting or destroying its activating potential. In general, the reaction between the Group VI transition metal carbonyl complex and the organometallic compound is carried out under an inert atmosphere.

Typical solvents which may be utilized are $C_1$–$C_{15}$, preferably $C_1$–$C_{10}$ alkanes, $C_6$–$C_{20}$ aryls, $C_1$–$C_{10}$ haloalkanes such as methyl chloride, $C_6$–$C_{15}$ haloaryls, and certain haloalkenes which have a halogen substituted on the double bond. Examples of solvents which may be used include pentane, hexane, decane, benzene, xylene, carbon tetrachloride, dichloromethane, chlorobenzene, bromobenzene, tetrachloroethylene, trichloroethylene, etc.

Following the formation of the catalyst, suitable olefins may be added directly in order to commence the disproportionation reaction. The catalyst may be generated in the presence of the reacting olefins, i.e. the olefin may be utilized as the solvent for the above described reaction.

The catalyst may also be deposited on an inert solid support such as silica, alumina, clay, silica-alumina, zeolites, etc.

The basic formula for the homo disproportionation of an olefin is as follows:

| A | B | C |
|---|---|---|
| 2 R$_1$(R$_2$)C=CR$_3$(R$_4$) | ⇌ R$_1$(R$_2$)C=CR$_1$(R$_2$) | +R$_3$(R$_4$)C=CR$_3$(R$_4$) |

In the above reaction $R_1$, $R_2$, $R_3$ and $R_4$ may be selected from the group consisting of alkyl, aryl, alkenyl, alkaryl, aralkyl, cycloalkyl, cycloalkenyl or hydrogen. Additionally, halogenated derivatives of any of the preceding compounds may also be utilized provided that the halogen is more than two carbon atoms removed from the double bond. At least one of the group consisting of $R_1$, $R_2$, and $R_3$ and $R_4$ must be an aryl radical or an R''—CH$_2$ radical wherein R'' is an alkyl, aryl, alkenyl, alkaryl, aralkyl, cycloalkyl or cycloalkenyl radical or a hydrogen atom. Halogenated derivatives of any of the aforesaid radicals may be utilized providing that the halogen is more than 2 carbons removed from the double bond.

More particularly, $R_1$, $R_2$, $R_3$ and $R_4$ may be selected from the group consisting of $C_1$–$C_{30}$ alkyl, $C_6$–$C_{20}$ aryl including those aryls in which two aromatic rings are condensed, $C_2$-$C_{30}$ alkenyl but not conjugated dienes, $C_7$-$C_{20}$ alkaryls, $C_7$-$C_{20}$ aralkyl, $C_3$-$C_{20}$ cycloalkyl, $C_3$-$C_{20}$ cycloalkenyl radicals provided that there are no conjugated double bonds within the cycloalkenyl radical, or a hydrogen atom. Again, halogen derivatives, preferably chlorine, of the previously mentioned radicals may be utilized providing the chlorine or halogen is more than two carbons removed from the double bond.

As previously mentioned, at least one of the said $R_1$, $R_2$, $R_3$ and $R_4$ must be aryl radical or an $R'$-$CH_2$ radical wherein $R'$ is a $C_1$-$C_{30}$ alkyl, a $C_6$-$C_{20}$ aryl, a $C_2$-$C_{20}$ alkenyl, a $C_7$-$C_{20}$ alkaryl, a $C_7$-$C_{20}$ aralkyl, a $C_3$-$C_{20}$ cycloalkyl or a $C_3$-$C_{20}$ cycloalkenyl or a hydrogen atom. The most preferred values for $R_1$, $R_2$, $R_3$, and $R_4$ are $C_1$-$C_{20}$ alkyls, $C_6$-$C_{20}$ aryls, and $C_2$-$C_{20}$ alkenyls and hydrogen, provided that at least one of said $R_1$, $R_2$, $R_3$, and $R_4$ is an aryl radical or an $R'CH_2$ radical wherein $R'$ is a $C_1$-$C_{20}$ alkyl, $C_6$-$C_{20}$ aryl, and $C_2$-$C_{20}$ alkenyl or hydrogen. Additionally, the catalyst of the instant invention is useful for cross disproportionation; by cross disproportionation is meant those reactions in which a mixture of two different olefins is reacted to form at least one olefinic product. At least one of the products obtained is different from either of the reactants. The general concept of cross disproportionation is illustrated by the following formula:

$R_1(R_2)C=C(R_3)R_4 + R_5(R_6)C=C(R_7)R_8 \rightleftarrows$ $R_1(R_2)C=C(R_7)R_8 + R_1(R_2)C=C(R_6)R_5$
$+ R_4(R_3)C=C(R_7)R_8 + R_4(R_3)C=(R_6)R_5$ Indicative of the homo disproportionation reaction and the products produced is the following Table.

The transformation of one or more cyclic mono or polyolefins in such a manner that a new cyclic polyene of higher molecular weight is produced is represented by the disproportionation of one or more olefins having the general formula:

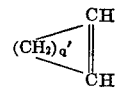

A general equation for such a reaction is:

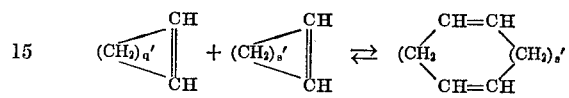

In this case $q'$ and $s'$ are integers which may vary from 2 to 30 and they may be the same or different. It is understood that in this reaction the products may react further in a similar manner to form materials of higher molecular weight.

The transformation of one or more acyclic polyolefins is represented by the disproportionation of one or more acyclic polyolefins having the general formula:

$S_1$—$CH=CH$—$(CH_2)_q$—$CH=CH$—$S_2$

Acyclic polyolefins may react to form cyclic mono or

TABLE

| Reactant | | Products, C |
|---|---|---|
| A | B | |
| $2R_1(R_2)C=CR_3(R_4)$ | $R_1(R_2)C=CR_1(R_2)$ | $+R_3(R_4)C=CR_3(R_4)$ |
| $CH_3CH_2CH_2CH=CH_2$ | $CH_3CH_2CH_2CH=CHCH_2CH_2CH_3$ | $+CH_2=CH_2$ |
| $CH_3(CH_2)_{17}CH=CH$ | $CH_3(CH_2)_{17}CH=CH(CH_2)_7CH_3$ | $+CH_2=CH_2$ |
| $CH_3CH_2CH=CHCH_3$ | $CH_3CH_2CH=CHCH_2CH_3$ | $+CH_3CH=CHCH_3$ |
| $C_6H_5CH_2CH_2CH=CH_2$ | $C_6H_5CH_2CH_2CH=CHCH_2CH_2C_6H_5$ | $+CH_2=CH_2$ |
| $ClCH_2CH_2CH_2CH_2CH=CH_2$ | $ClCH_2CH_2CH_2CH_2CH$ $=CHCH_2CH_2CH_2CH_2Cl$ | $CH_2=CH_2$ |
| 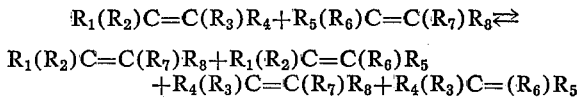 | | $CH_2=CH_2$ |
| $CH_3CH_2\underset{\underset{CH_3}{\|}}{C}=CHCH_2CH_2CH_3$ | $CH_3CH_2(CH_3)C=C(CH_3)CH_2CH_3$ | $CH_3CH_2CH_2CH=CHCH_2CH_3$ |
| $CH_2=CHCH_2CH=CH_2$ | $CH_2$—$CHCH_2CH=CHCH_2CH=CH_2$ | $+CH_2=CH_2$ |
| 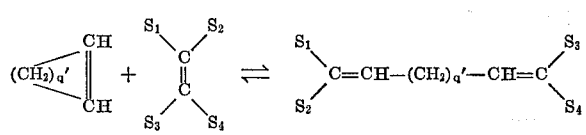 | | $+CH_2=CH_2$ |

Other disproportionation reactions of the instant invention include the following:

The transformation of a mixture of an acyclic mono- or polyolefin and a cyclic mono or polyolefin in such a way as to form a new acyclic polyolefin of higher molecular weight than the starting materials. A general equation for such a reaction is:

In this case $q'$ is an intger varying from 2 to 30. The reverse of this reaction may also be carried out; thus one may employ an acyclic polyolefin as a starting material and can obtain a cyclic mono or polyolefin and an acyclic mono or polyolefin of lesser molecular weight than the starting material as products.

polyolefins and acyclic mono or polyolefins. A general equation for such a reaction is:

$S_1$—$CH=CH$—$(CH_2)_q$—$CH=CH$—$S_2$
$+$
$S_3$—$CH=CH$—$(CH_2)_s$—$CH=CH$—$S_4$ $\rightleftarrows$ $S_1$—$CH=CH$—$S_3$
$+$
$\underset{\underset{(CH_2)_s}{\phantom{x}}}{\overset{CH-(CH_2)_q-CH}{\|\phantom{xxx}\|}}$
$CH \phantom{xxxx} CH$
$+$
$S_2$—$CH=CH$—$S_4$ In this case $q$ and $s$ are integers and may vary from 1 to 20 and may be the same or different In the above equations $S_1$ through $S_4$ are selected from the group consisting of alkyl, aryl, alkenyl, alkaryl, aralkyl, cycloalkyl, cycloalkenyl, halogen derivatives of the aforesaid and hydrogen. It is preferred that $S_1$ through $S_4$ be selected from the group consisting of $C_1$ through $C_{20}$ alkyl, $C_6$ to $C_{20}$ aryl, $C_2$ to $C_{20}$ alkenyl, $C_7$ to $C_{20}$ alkaryl, $C_7$ to $C_{20}$ aralkyl, $C_3$ to $C_{20}$ cycloalkyl and $C_3$ to $C_{20}$ cycloalkenyl, halogen derivatives thereof, preferably chlorine.

Typical reactants and products which illustrate the preceding reactions are as follows:

TABLE

| Reactants | Product |
|---|---|
| $CH_3CH_2CH_2CH=CHCH_2CH_2CH_3 + CH_3CH=CHCH_3$ | $CH_3CH_2CH_2CH=CHCH_3$ |
| $CH_3CH_2CH=CH_2 + CH_3CH_2CH_2CH=CHCH_3$ | $CH_3CH=CH_2 + CH_3CH_2CH_2CH=CH_2 + CH_3CH_2CH=CHCH_3$ <br> $+ CH_3CH_2CH_2CH=CHCH_2CH_3$ |
| $\underset{\underset{CH_3}{\|}}{CH_3C}=CHCH_2-\underset{\underset{CH_3}{\|}}{CHCH_3} + CH_3CH=CHCH_3$ | $CH_3-\underset{\underset{CH_3}{\|}}{C}=CHCH_3 + CH_3CH=CH-CH_2\underset{\underset{CH_3}{\|}}{CHCH_3}$ |
| $CH_2=CHCH_2CH_2CH=CH_2 + CH_3CH_2CH_2CH=CH_2$ | $CH_2=CHCH_2CH_2CH=CHCH_2CH_3$ |
| $ClCH_2CH_2CH_2CH=CH_2 + CH_3CH=CHCH_3$ | $ClCH_2CH_2CH_2CH=CHCH_3 + CH_2=CHCH_3$ |
| | $CH_2=CHCH_2CH_2CH_2CH_2CH=CH_2$ |
|  $+ CH_2=CH_2$ | |
|  $+ CH_3CH=CHCH_2CH_3$ | $CH_3CH=CHCH_2CH_2CH=CHCH_2CH_3$ |
|  $+ CH_2=CH_2$ | $CH_2=CHCH_2CH_2CH=CH_2$ |
| $CH_2=CHCH_2CH_2CH_2CH_2CH=CH_2$ |  $+ CH_2=CH_2$ |
| $CH_2=CHCH_2CH=CHCH_2CH=CH_2$ |  $+ CH_2=CH_2$ |
| $CH_2=CHCH_2\underset{\underset{CH_3}{\|}}{CH}-CH_2CH_2-CH=CHCH_3$ | $CH_3-$$+ CH_2=CHCH_3$ |
| 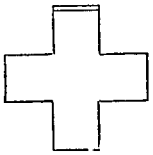 |  $n\geq 2$ |
|  |  $n\geq 2$ |
| $CH_2=CHCH_2CH=CH_2$ |  $+ CH_2=CH_2$ |

Reaction conditions in the above reactions are substantially identical to the reaction conditions utilized to form the catalyst of the instant invention. That is to say, the reactants are contacted at temperatures of −100 to +150° C., preferably 0° to 50° C. at pressures which may range from 0.1 and 1000 atm. and preferably 1 and 100 atm. Contact times will vary between 1 min. and several days, preferably between 0.2 and 24 hours. The reactants should be contacted in the liquid phase within an inert solvent, preferably an organic inert solvent, or the reacting olefin itself may be employed as solvent. Typical solvents which may be utilized are the $C_1$ to $C_{15}$ alkanes, $C_6$ to $C_{10}$ aryls, halogenated $C_1$ to $C_{10}$ alkanes, $C_6$ to $C_{15}$ haloaryls and certain haloalkenes. Specific examples of solvents include pentane, hexane, decane, benzene, xylene, carbon tetrachloride, methylene chloride, tetrachloroethylene, trichloroethylene, chlorobenzene. A wide range of ratios of reactants to catalysts may be employed. Ratios of reactant to catalyst from 10:1 to 10,000:1 on a molar basis may be used with preferred ratios of from 100:1 to 1000:1.

The following examples illustrate the invention.

Example 1.—Disproportionation of a linear terminal olefin with high olefin to catalyst ratio In a dried two-ounce bottle 0.00005 moles of $(n-C_4H_9)_4N[Mo(CO)_5Br]$ was contacted with 10 ml. chlorobenzene and 10 ml. pentene-1 at ambient conditions. To this mixture 0.4 ml. of 1.0 molar solution of methylaluminum dichloride in chlorobenzene was added in one portion and the reaction was allowed to proceed at atmospheric pressure at ambient temperature for 24 hours. A volatile gas was bubbled off during this time; at the end of 24 hours the mixture was stripped on a rotary evaporator under a 15 mm. vacuum. The products were collected by condensation in a trap cooled in a Dry Ice acetone bath and then analyzed by vapor phase chromatography. The analysis indicated that the product consisted of 46.4 mole percent pentene-1 and 53.6 percent of octene-4 on a solvent free basis.

Example 2.—Use of the BR derivative rather than Cl

In this example an experiment identical to Example 1 with regard to process conditions was carried out except that the catalyst consisted of 0.0005 moles of $(n-C_4H_9)_4N[Mo(CO)_5Br]$ and the activator was 4 ml. of a 1.0 molar solution of ethyl aluminum dichloride; reaction time was again 24 hours. The products recovered, by the technique defined in Example 1, consisted of 89.8 mole percent pentene-1, 0.7 percent pentene-2 and 9.5 percent octene-4 as determined by vapor phase chromatography.

Example 3.—Use of Cr derivative rather than Mo

In this example an experiment identical to Example 1 was carried out except that the catalyst consisted of 0.0005 moles of $(n-C_4H_9)_4N[Cr(CO)_5Cl]$ and the activator was 2 ml. of a 1.0 molar solution of methyl aluminum dichloride. The product recovered and identified as in Example 1 by vapor phase chromatography was 93.4 mole percent pentene-1, and 6.6 percent octene-4.

Example 4.—Use of W derivatives

In this example an experiment identical to Example 1 was carried out except that the catalyst consisted of 0.0005 moles of $(n-C_4H_9)_4N[W(CO)_5Cl]$ and the activator was 4 ml. of a 1.0 molar solution of methyl aluminum dichloride. The product after a period of 24 hours was determined by vapor phase chromatography to be 30.8 mole percent pentene-1, 0.3 percent heptene, and 68.9 percent octene-4 on a solvent free basis.

Example 5.—Reaction carried out at elevated temperature

A heavy-walled glass reaction vessel fitted with a Teflon valve capable of withstanding elevated pressures was charged with 0.0005 mole $(n-C_4H_9)_4N[Mo(CO)_5Br]$, 10 ml. chlorobenzene and 10 ml. pentene-1. A quantity of 1.0 molar solution of methylaluminum sesquichloride in chlorobenzene was added so that the eventual ratio of aluminum to molybdenum was 8:1. The valve was then closed and the reaction vessel was placed in an oil bath at 60° C. for four hours. The vessel was then removed from the bath and allowed to cool to room temperature over a period of one hour. The valve was then reopened to allow gaseous products to escape and the reaction mixture was stripped on a rotary evaporator under vacuum. The products were collected in a trap cooled to −78° C. over a period of 0.2 hours; the products were analyzed by vapor phase chromatography and on a solvent-free basis consisted of 86.2 mole percent pentene-1, 5.0 percent pentene-2, and 8.8 percent octene-4.

Example 6.—Addition of a Lewis base modifier

A two ounce bottle was charged with 0.0005 mole $(n-C_4H_9)_4N[Mo(CO)_5Br]$ 0.0005 mole triphenylphosphine, 10 ml. chlorobenzene, and 10 ml. pentene-1. Four ml. of a 1.0 molar solution of methylaluminum dichloride in chlorobenzene was then added. The reaction was allowed to proceed at ambient temperature and atmospheric pressure; any gaseous products were allowed to escape. After 24 hours the reaction mixture was stripped on a rotary evaporator under a 20 mm. vacuum. The products were collected in a trap at −78° C. and atmospheric pressure. Analysis of the product by vapor phase chromatography indicated that the products consisted of 78.3 mole percent pentene-1, 14.9 percent pentene-2, and 6.8 percent octene-4 on a solvent free basis.

Example 7.—Disproportionation of a cyclic olefin

A two ounce bottle was charged with 0.0005 moles $(n-C_4H_9)_4[Mo(CO)_5Br]$, 10 ml. chlorobenzene and 10 ml. cyclopentene. A sufficient amount of a 1.0 molar solution of methylaluminum sesquichloride in chlorobenzene was added so that the aluminum molybdenum ratio was 8:1. The reaction was allowed to proceed for 24 hours at ambient temperature and atmospheric pressure. The reaction mixture, which had become very viscous, was then stripped on a rotary evaporator; volatile products were collected in a trap at −78° C. Approximately 6.4 grams of cyclopentene were recovered unchanged. Additionally, 1 gram of a tough rubbery polymer remained in the flask after the volatile materials had been removed.

Example 8.—Disproportionation of a long chain terminal olefin

To a flask containing 0.0005 moles

10 g. eicosene-1, and 10 ml. chlorobenzene was added 4 ml. of a 1.0 molar solution of $CH_3AlCl_2$ in chlorobenzene. The mixture was heated in an oil bath at 50° for 24 hours. The mixture was then poured into 300 ml. methanol and the white solid which precipitated was collected by filtration and dried. Analysis of the product by gas phase chromatography showed approximately 25 mole percent eicosene-1 and 75 percent octatricontene-19.

Example 9.—Disproportionation of an aryl substituted olefin

To a flask containing 0.0005 moles

10 ml. 4-phenylbutene-1 and 10 ml. chlorobenzene was added 4 ml. of a 1.0 molar solution of $CH_3AlCl_2$ in chlorobenzene. The mixture was allowed to stand at room temperature for 24 hours. The reaction was terminated by the addition of 5 ml. acetone. The resulting solution was analyzed by gas phase chromatography and was found to contain 35% 4-phenylbutene-1 and 65%, 1,6-diphenylhexene-3 on a solvent free basis.

Example 10.—Disproportionation of an internal linear olefin

To a two-ounce bottle containing 0.0005 mole

10 ml. cis pentene-2 and 10 ml. chlorobenzene was added 4 ml. of a 1.0 molar solution of $CH_3AlCl_2$ in chlorobenzene. The solution was allowed to stand at room temperature for 24 hours. The mixture was then stripped on a rotary evaporator under 20 mm. vacuum. Analysis of the products by gas phase chromatography showed a composition of 19.1 mole percent butene-2, 48.8 percent pentene-2, 31.3 percent hexene-3 and 0.8 percent heptenes on a solvent free basis.

Example 11.—Disproportionation of a branched olefin

An experiment similar to that described in Example 10 was carried out except that 10 ml. 3-methylbutene-1 was used as the reacting olefin. The products comprised of 80.7 mole percent 3-methylbutene-1 and 19.3 percent 2,5-dimethylhexene-3 on a solvent free basis as determined by gas phase chromatography.

Example 12.—Disproportionation of a linear diolefin to form a cyclic olefin product To a two ounce bottle containing 0.0005 mole

10 ml. 1,7-octadiene and 10 ml. chlorobenzene was added 3 ml. of a 1.0 molar solution of $CH_3AlCl_2$ in chlorobenzene. The reaction was allowed to proceed at room temperature and atmospheric pressure for 24 hours. The mixture was then stripped on a rotary evaporator under 20 mm. vacuum and the products were analyzed by vapor phase chomatography. The product consisted of greater than 99 percent cyclohexene on a solvent free basis.

Example 13

An experiment identical to that described in Example 12 was carried out with the exception that 10 ml. 1,4-pentadiene was employed as the reacting olefin. In this case the products as determined by vapor phase chromatography had a composition of 90.4 mole percent 1,4-pentadiene, 0.2 percent 1,4-cyclohexadiene and 9.4 percent 1,4,7-octatriene.

Example 14.—Cross disproportionation

To a two ounce bottle containing 0.0005 moles

10 ml. chlorobenzene, 5 ml. trans-2-butene and 5 ml. trans-4-octene was added 4 ml. of a 1 molar solution of $CH_3AlCl_2$ in chlorobenzene. The mixture was allowed to stand at room temperature and atmospheric pressure for 24 hours. The solution was then stripped on a rotary evaporator under 20 mm. vacuum. The product was analyzed by vapor phase chromatography and was found to contain 33.3 mole percent butene-2, 51.1 percent hexene-2 and 15.6 percent octene-4 on a solvent free basis.

Example 15

An experiment identical to that described in Example 14 was carried out except that a mixture of 5 ml. vinyl cyclohexane and 5 ml. trans-2-butene was used as the reacting olefin mixture. The composition of the resulting product as determined by vapor phase chromatography was approximately 30 mole percent butene-2, 25 percent vinylcyclohexane and 44 percent 1-cyclohexylpropene on a solvent free basis.

Example 16.—Reaction run without solvent

To a two-ounce bottle containing 0.0010 mole

$(n-C_4H_9)_4N[Mo(CO)_5Cl]$ and 20 ml. pentene-1 was added 0.82 grams of liquid methylaluminum sesquichloride. The reaction was allowed to proceed at room temperature and atmospheric pressure for 3 hours. The mixture was then stripped on a rotary evaporator and the product was analyzed by gas phase chomatography. The composition of the product was 18.4 mole percent pentene-1, 0.2 percent hexene, 0.4 percent heptenes and 81.1 percent octene-4.

Example 17.—Disproportionation of cyclic olefin to form polymer

To a bottle containing 0.0020 moles

$(n-C_4H_9)_4N[Mo(CO)_5Cl]$, 40 ml. chlorobenzene and 40 ml. cyclooctene was added 8.0 ml. of a 1.0 molar solution of $CH_3AlCl_2$ in chlorobenzene. The mixture was stirred for 15 minutes then the resulting viscous solution was poured into 1000 ml. methanol. A white rubbery polymer precipitated which was collected on a filter, washed with an additional 500 ml. methanol and finally dried under high vacuum. The yield of dried polymer was 31.0 grams.

Example 18.—Cross disproportionation of cyclic and linear olefin to form linear diolefin A mixture of 0.002 moles $(n-C_4H_9)_4N[Mo(CO)_5Cl]$, 40 ml. chlorobenzene and 40 ml. cyclohexene was placed in a stainless steel autoclave, then 16 ml. of a 1.0 molar solution of $CH_3AlCl_2$ was added under argon pressure. Ethylene gas was then introduced until the total pressure of ethylene was 800 p.s.i. The mixture was vigorously stirred under this pressure for 16 hours. The gas pressure was then released and the reaction mixture was stripped on a rotary evaporator under vacuum. The product was analyzed by vapor phase chromatography and was found to be 98.6 mole percent cyclohexene and 1.4 percent 1,7-octadiene on a solvent free basis.

What is claimed is:

1. A process for the disproportionation of olefins, which comprises contacting a feedstream containing at least one olefinic compound capable of being disproportionated with a catalyst which is prepared by contacting a carbonyl complex having the general formula $R[M(CO)_aX_b]$ wherein R is selected from the group consisting of alkali metal ions and cations of the type $J_4Q$ wherein Q is selected from the group consisting of nitrogen, phosphorous, arsenic, and antimony, and J is selected from the group consisting of hydrogen, hydrocarbyl radicals, and the halogenated and oxygenated derivatives thereof, having up to 30 carbon atoms, M is a Group VI transition metal, X is a uninegatively charged ligand, selected from the group consisting of halide, cyanide, cyanate, thiocyanate, azide, $C_1$ to $C_{20}$ alkoxide radicals, $C_1$ to $C_{20}$ carboxylate radicals, and the halogenated derivatives thereof, $a$ is an integer from 1 to 5, and $b$ is an integer of from 1 to 3, with an activator, said activator comprising a compound selected from the group consisting of compounds having the general formula $r_nLY_m$ wherein $r$ is independently selected from the group consisting of hydrogen, hydrocarbyl radicals, and the halogenated and oxygenated derivatives thereof, said activator containing up to 30 carbon atoms, L is selected from the group consisting of Group I-A, II-A and III-A metals, said metals having an atomic number of from 3 to 31, Y is a halogen radical, $n$ is an integer of from 1 to 3, and $m$ is an integer of from 0 to 3, $n$ and $m$ having a total equal to the valence of L, at a temperature of from about $-100$ to $+150°$ C. and a pressure of between 0.1 and 1000 atmospheres, the molar ratio of the activator to carbonyl complex varying between 0.5:1 and 50:1, whereby said olefinic compound is disproportionated.

2. The process of claim 1, wherein said carbonyl complex has a general formula $J_4N[M(CO)_5X]$ wherein J is a $C_1$-$C_{30}$ hydrocarbyl radical, M is a Group VI transition metal, and X is a halide.

3. The process of claim 2, wherein $r$ is a $C_1$-$C_{30}$ hydrocarbyl radical, L is a Group III-A metal, and Y is selected from the group consisting of chlorine and bromine radicals.

4. The process of claim 3, wherein said activator is selected from the group consisting of compounds having the general formula $R'AlY_2$ wherein $R'$ is selected from the group consisting of $C_1$-$C_{12}$ alkyl radicals, and Y is chloride.

5. The process of claim 3, wherein said olefin has the general formula $R_1(R_2)C=CR_3(R_4)$ wherein $R_1$, $R_2$, $R_3$, and $R_4$ are independently selected from the group consisting of hydrogen, $C_1$-$C_{30}$ alkyl, $C_6$-$C_{20}$ aryl, $C_2$-$C_{30}$ alkenyl, $C_7$-$C_{20}$ alkaryl, $C_7$-$C_{20}$ aralkyl, $C_3$-$C_{20}$ cycloalkyl, $C_3$-$C_{20}$ cycloalkenyl radicals and halogenated derivatives thereof wherein said halogen is more than two carbons removed from a double bond and at least one of $R_1$, $R_2$, $R_3$, and $R_4$ is a $C_6$-$C_{20}$ aryl radical or an $R'$—$CH_2$ radical wherein $R'$ is selected from the group consisting of hydrogen, $C_1$-$C_{30}$ alkyl, $C_6$-$C_{20}$ aryl, $C_2$-$C_{20}$ alkenyl, $C_7$-$C_{20}$ alkaryl, $C_3$-$C_{20}$ aralkyl, $C_3$-$C_{20}$ cycloalkenyl radicals, halogenated derivatives thereof wherein said halogen is more than two carbons removed from a double bond.

6. The process of claim 5, wherein said olefin is contacted with said catalyst at a temperature of from 0 to 50° C., a pressure of from 1 to 100 atmospheres and the contact time is from about 0.2 to 24 hours.

7. The process of claim 3, wherein said olefin is selected from the group consisting of olefins having the general formula:

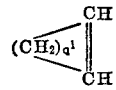

wherein $q'$ is an integer of from 2 to 30.

8. The process of claim 3, wherein a mixture of two or more olefins is cross disproportionated.

9. The process of claim 8, wherein said olefin mixture comprises a mixture of an acyclic mono or polyolefin and a cyclic mono or polyolefin, said acylic mono or polyolefin being selected from the group consisting of the compounds having the formula:

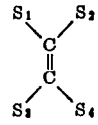

and said cyclic mono or polyolefin is selected from olefins having the general formula

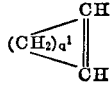

wherein $S_1$, $S_2$, $S_3$ and $S_4$ are selected from the group consisting of hydrogen, $C_1$-$C_{20}$ alkyl, $C_6$-$C_{20}$ aryl, $C_2$-$C_{20}$ alkenyl, $C_7$-$C_{20}$ alkaryl, $C_7$-$C_{20}$ aralkyl, $C_3$-$C_{20}$ cycloalkyl, $C_3$-$C_{20}$ cycloalkenyl, and the halogenated derivatives thereof, and $q'$ is an integer varying from 2 to 30.

10. The process of claim 8, wherein two or more olefins having the general formula:

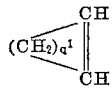

wherein $q'$ is an integer of from 2 to 30, are cross disproportionated.

11. The process of claim 3, wherein said olefin has a general formula:

$$S_1\text{—CH=CH—}(CH_2)_q\text{—CH=CH—}S_2$$

wherein $S_1$ and $S_2$ are selected from the group consisting of hydrogen, $C_1$-$C_{20}$ alkyl, $C_6$-$C_{20}$ aryl, $C_2$-$C_{20}$ alkenyl, $C_7$-$C_{20}$ alkaryl, $C_7$-$C_{20}$ aralkyl, $C_3$-$C_{20}$ cycloalkyl, $C_3$-$C_{20}$ cycloalkenyl, and the halogenated derivatives thereof, and $q$ is an integer of from 1 to 20.

12. The process of claim 8 wherein two or more olefins having the general formula:

$$S_1\text{—CH=CH—}(CH_2)_q\text{—CH=CH—}S_2$$

wherein $S_1$ and $S_2$ are selected from the group consisting of $C_1$-$C_{20}$ alkyl, $C_6$-$C_{20}$ aryl, $C_2$-$C_{20}$ alkenyl, $C_7$-$C_{20}$ alkaryl, $C_7$-$C_{20}$ aralkyl, $C_3$-$C_{20}$ cycloalkyl, $C_3$-$C_{20}$ cycloalkenyl, and the halogenated derivatives thereof, and $q$ is an integer of from 1 to 20, are cross disproportionated.

13. A process for the disproportionation of olefins, which comprises contacting a feedstream containing at least one olefinic compound capable of being disproportionated with a catalyst which is prepared by contacting a carbonyl complex having the general formula $$R[M(CO)_aX_b]$$

wherein R is selected from the group consisting of alkali metal ions and cations of the type $J_4Q$ wherein Q is selected from the group consisting of nitrogen, phosphorous, arsenic, and antimony, and J is selected from the group consisting of hydrogen, hydrocarbyl radicals, and the halogenated and oxygenated derivatives thereof, having up to 30 carbon atoms, M is a Group VI transition metal, X is a uninegatively charged ligand, selected from the group consisting of halide, cyanide, cyanate, thiocyanate, azide, $C_1$-$C_{20}$ alkoxide radicals, $C_1$-$C_{20}$ carboxylate radicals, and the halogenated derivatives thereof, $a$ is an integer from 1 to 5, and $b$ is an integer of from 1 to 3, with an activator, said activator comprising a compound selected from the group consisting of compounds having the general formula $AlX'_3$ wherein $X'$ is a halogen, at a temperature of from about $-100$ to $+150°$ C. and a pressure of between 0.1 and 1000 atmospheres, the molar ratio of the activator to carbonyl complex varying between 0.5:1 and 50:1, whereby said olefinic compound is disproportionated.

14. The process of claim 13 wherein $X'$ is chlorine.

15. A process for the disproportionation of olefins, which comprises contacting a feedstream containing at least one olefinic compound capable of being disproportioned with a catalyst which is prepared by contacting a carbonyl complex having the general formula $$R[M(CO)_aX_b]$$

wherein R is selected from the group consisting of alkali metal ions and cations of the type $J_4Q$ wherein Q is selected from the group consisting of nitrogen, phosphorous, arsenic, and antimony, and J is selected from the group consisting of hydrogen, hydrocarbyl radicals, and the halogenated and oxygenated derivatives thereof, having up to 30 carbon atoms, M is a Group VI transition metal, X is a uninegatively charged ligand, selected from the group consisting of halide, cyanide, cyanate, thiocyanate, azide, $C_1$-$C_{20}$ alkoxide radicals, $C_1$-$C_{20}$ carboxylate radicals, and the halogenated derivatives thereof, $a$ is an integer from 1 to 5, and $b$ is an integer of from 1 to 3, with an activator, said activator comprising a compound selected from the group consisting of compounds having the general formula $R'_cAl(OR')_d$ wherein $R'$ is selected from the group consisting of $C_1$-$C_{12}$ alkyl radicals, and $c$ and $d$ are integers of from 1 to 2, their total being equal to 3, at a temperature of from about $-100$ to $+150°$ C. and a pressure of between 0.1 and 1000 atmospheres, the molar ratio of the activator to carbonyl complex varying between 0.5:1 and 50:1, whereby said olefinic compound is disproportionated.

References Cited

UNITED STATES PATENTS

| | | | |
|---|---|---|---|
| 3,530,196 | 9/1970 | Singleton | 252—429 |
| 2,923,702 | 2/1960 | Lyons et al. | 252—429 |
| 2,951,066 | 8/1960 | Coover et al. | 252—431 |
| 3,081,287 | 3/1963 | Coover et al. | 252—429 |
| 3,463,829 | 8/1969 | Banks | 260—683 |
| 3,511,885 | 5/1970 | Hughes | 252—431 |
| 3,686,136 | 8/1972 | Doyle | 260—683 |

FOREIGN PATENTS

| | | | |
|---|---|---|---|
| 1,159,053 | 7/1969 | Great Britain | 252—443 |

DELBERT E. GANTZ, Primary Examiner

C. E. SPRESSER, Jr., Assistant Examiner

U.S. Cl. X.R.

260—93.1, 648 R, 649 R, 654 R, 666 H, 668 R, 677 R, 680 R